United States Patent [19]
Hessert et al.

[11] 3,919,849
[45] Nov. 18, 1975

[54] PROCESS FOR THE AGGLOMERATION AND STABILIZATION OF UNCONSOLIDATED SOIL

[75] Inventors: James E. Hessert; Richard L. Clampitt, both of Bartlesville, Okla.

[73] Assignee: Phillips Petroleum Company, Bartlesville, Okla.

[22] Filed: Aug. 15, 1973

[21] Appl. No.: 388,542

Related U.S. Application Data

[63] Continuation-in-part of Ser. No. 318,702, Dec. 27, 1972, abandoned, which is a continuation-in-part of Ser. No. 159,052, July 1, 1971, Pat. No. 3,727,687.

[52] U.S. Cl. ............................................. 61/36 R
[51] Int. Cl.$^2$ ............................................. E02D 3/14
[58] Field of Search ...... 61/36 R, 35; 166/294, 295; 106/287 SS; 260/DIG. 14; 404/75; 71/64 SC; 117/2 R

[56] References Cited
UNITED STATES PATENTS

| | | | |
|---|---|---|---|
| 2,543,868 | 3/1951 | Prokop | 166/294 |
| 3,227,572 | 1/1966 | Rundle et al. | 61/36 R |
| 3,378,070 | 4/1968 | Wessler et al. | 166/294 |
| 3,490,241 | 1/1970 | Kuhn | 61/36 R |
| 3,502,149 | 3/1970 | Pence, Jr. | 166/295 |
| 3,749,174 | 7/1973 | Friedman et al. | 166/294 |

*Primary Examiner*—Paul R. Gilliam
*Assistant Examiner*—Alex Grosz

[57] ABSTRACT

A process for the agglomeration and stabilization of unconsolidated soil is described which comprises the steps of introducing an aqueous medium into unconsolidated soil. At least a portion of the aqueous medium comprises an aqueous gel wherein the gel comprises water to which there has been added a water-thickening amount of a water-soluble cellulose ether, a sensible amount of a water-soluble compound of a reducible polyvalent metal, and a sensible amount of a water-soluble reducing agent. The polyvalent metal compound, capable of being reduced to a lower polyvalent valence state, is present in an amount sufficient to gel the water-soluble cellulose ether when the valence of at least a portion of the polyvalent metal is reduced to a lower valence state, and the water-soluble reducing agent is present in an amount sufficient to reduce at least a portion of said polyvalent metal to a lower valence state. The process can be employed to establish a fluid barrier, for example, by sealing fluid passageways such as openings in underground conduits and pores in soil.

10 Claims, No Drawings

PROCESS FOR THE AGGLOMERATION AND STABILIZATION OF UNCONSOLIDATED SOIL

This application is a continuation-in-part of copending application Ser. No. 318,702, filed on Dec. 27, 1972, now abandoned, which in turn is a continuation-in-part of application Ser. No. 159,052, filed July 1, 1971, now U.S. Pat. No. 3,727,687.

This invention relates to a process for the agglomeration and stabilization of unconsolidated soil and for the establishment of a fluid barrier in a porous medium.

Various processes for the treatment of soil in order to solidify it to a state whereby it is sufficiently cohesive to possess a number of highly desirable qualities are well known in the art. Such qualities include, among others, the ability to bear high-pressure loads, the ability to withstand penetration by water, and the ability to resist erosion by water or other natural forces.

Subsurface diffusions such as those occurring when an underground conduit ruptures are well known. Such diffusions occur, for example, as the material being transported through a conduit leaks therefrom and enters the surrounding soil. Inasmuch as such diffusions are facilitated by the absorptivity and permeability of the soil and frequently such leakage cannot be immediately remedied by stoppage at the source, it is important that there be provided a method of enveloping the source of the diffusion and minimizing the extent to which the diffusion occurs. The present invention provides such a method.

The underground conduits which will benefit from the process of the present invention are those which carry fluids, either gaseous or liquid. Particularly applicable are utility conduits formed of joined sections of cast iron, steel, ceramic or plastic material, or similar piping. Such conduits are, for the most part, relatively shallowly deployed in a generally horizontal position and are used in the distribution or in the gathering of the fluids over a wide area. Specific examples of such conduits are natural gas lines, water lines, and sewage lines.

In most cases, substantial leaks in such conduits cannot be easily tolerated. For example, leaks in gas lines, water lines, or sewage lines can result in losses to, or contamination of, the adjoining soils. Similarly, leaks in such conduits can be equally intolerable when external liquids, such as natural surface or subterranean waters, infiltrate the conduit. Thus, sewer lines located beneath the water table level or subject to contact with tide waters or rain run-off can be infiltrated by water causing undesirable dilution of the contents of the sewer line and a corresponding overload of the sewage disposal system.

New soil treatment processes which improve the solid state properties of soil after agglomeration and consolidation are of continuing interest to the arts in general.

It is an object of this invention to provide a process for agglomeration and stabilization of unconsolidated soil and thereby obtain a consolidated soil structure having improved load-bearing strength. It is an object of the invention to provide a process for establishing a fluid barrier in a porous medium. Another object of the invention is to provide an improved process for sealing openings in underground conduits. Yet another object of the invention is to provide an improved process for providing a fluid barrier in porous surface soil. Another object is to provide a process for sealing unconsolidated porous earth adjoining earth channels or passageways, artificially or naturally produced, in order to form earthen structures having improved resistance to water penetration, enhanced load-bearing qualities, and substantially decreased susceptibility to erosion. Still another object is to provide a process for the treatment of passageways or channels in order to reduce vadose water penetration into the passageways or channels. These and other objects will be readily apparent to those skilled in the art from the following description and appended claims.

In accordance with this invention, a process is provided for the agglomeration and stabilization of unconsolidated soil and/or the establishment of a fluid barrier which comprises the steps of contacting an unconsolidated and/or porous soil with an aqueous medium containing a water-soluble cellulose ether, a sensible amount of a water-soluble reducible polyvalent metal compound wherein the metal present is capable of being reduced to a lower polyvalent state and wherein the polyvalent metal compound is present in amounts sufficient to gel the water-soluble cellulose ether when the valence of at least a portion of the polyvalent metal is reduced to a lower valence state, and an amount of water-soluble reducing agent which is effective to reduce at least a portion of the reducible polyvalent metal compound to said lower valence state.

In one of its broadest aspects the treatment process of this invention comprises contacting unconsolidated soil particulate matter with an aqueous medium as described herein, whereby as a direct result of the combination of the soil and aqueous medium components, a structured mass is formed which has improved load-bearing characteristics in contrast to the untreated unconsolidated soil. In another aspect the process of this invention can be applied to openings in underground conduits and/or porous soil to establish a fluid barrier. The invention can be employed by applying the aqueous medium to the surface soil of channels, lakes, ponds, irrigation ditches, and spillways to prevent loss of water through absorption into the soil. The invention can be utilized to seal leaks in underground conduits to prevent exfiltration and/or infiltration. The invention can be utilized to treat the surface soil on river banks, new yards, new highway embankments, earthen dams and spillways, farmland terraces and other situations where loose soil may erode, to stabilize the soil. The invention can be employed to hold soil which has been freshly seeded or sprigged until the plants have time to grow.

The process of this invention is applicable to treatment of any unconsolidated and/or porous soil. Unconsolidated and/or porous soil is herein defined as any variety of soil, regardless of how formed or regardless of how classified, based on the chemical elements contained therein, provided the soil is unconsolidated and/or porous in structure. Typical materials common to unconsolidated and/or porous soils, both topsoils and subsoils, are sand, gravel, silt, mud, clay, large rock fragments and which also can contain heavy fluid muds, crushed granite, cement, loams, peat, organic matter and inorganic matter in particulate form such as humus, siliceous compounds and the like.

In general, any water-soluble cellulose ether or mixtures thereof can be employed in the practice of this invention. Such cellulose ethers or ether mixtures can include, among others: the various carboxyalkyl cellulose ethers, e.g., carboxyethyl cellulose and carboxymethyl cellulose (CMC); mixed ethers such as carboxyalkyl hydroxyalkyl ethers, e.g. carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose; and the like. Many of said cellulose ethers are available commercially in various grades. The carboxy-substituted cellulose ethers are available as the alkali metal salt, usually the sodium salt. However, the metal is seldom referred to, and the salts are commonly referred to as CMC, CMHEC, etc. For example, water-soluble CMC is available in various degrees of carboxylate substitution ranging from about 0.3 up to the maximum of substitution of 3. In general, CMC having a degree of substitution in the range of about 0.65 to about 0.95 is preferred. Frequently, CMC having a degree of substitution in the range of about 0.85 to about 0.95 is a more preferred cellulose ether. CMC having a degree of substitution less than the above preferred ranges is usually less uniform in properties and thus less desirable for use in the practice of the invention. CMC having a degree of substitution greater than the above preferred ranges usually has a lower viscosity and more is required in the practice of the invention. The degree of substitution of CMC is commonly designated in practice as CMC-7, CMC-9, CMC-12, etc., where the 7, 9 and 12 refer to a degree of substitution of 0.7, 0.9 and 1.2, respectively.

In the above-described mixed ethers, it is preferred that the portion thereof which contains the carboxylate groups be substantial instead of a mere trace. For example, in CMHEC it is preferred that the carboxymethyl degree of substitution be at least about 0.4. The degree of hydroxyethyl substitution is less important and can vary widely, e.g., from about 0.1 or lower to about 4 or higher.

The amount of cellulose ether used in the practice of the invention can vary widely depending upon the viscosity grade and purity of the ether, as well as the properties of the aqueous gel prepared prior to contact of the unconsolidated soil or when prepared in situ by the addition, in the presence of water, of the chemical constituents to unconsolidated soil. For example, the use of water-soluble ether in amounts in the range of about 50 to about 50,000 parts per million (ppm) by weight of aqueous medium can be employed with beneficial results. Preferably amounts within the range of from about 300 to about 15,000 ppm of ether can be employed advantageously.

The reducible polyvalent metal compounds which can be used in the practice of this invention are water-soluble compounds of polyvalent metals wherein the metal is present in a valance state which is capable of being reduced to a lower polyvalent valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal compounds for use in the practice of the invention. The hexavalent chromium in the chromium compounds can be reduced in situ to trivalent chromium by suitable reducing agents, which will be discussed in greater detail hereinafter. In permanganate compounds the manganese is reduced from +7 valence to +4 valence as in $MnO_2$.

The amount of the reducible polyvalent metal compounds used in the practice of the invention will be a sensible amount, i.e., a small but finite amount which is more than incidental impurities and which is effective or sufficient to cause subsequent gelation of water-soluble cellulose ether in the presence of water, when the metal in the polyvalent metal compound is reduced to a lower polyvalent valence state. The lower limit of concentration of the starting metal compound will be dependent upon several factors, including the particular type of cellulose ether used, the concentration of the cellulose ether in the water to be gelled, the water which is used, and the type of gel product desired. For similar reasons, the upper limit on the concentration of the starting metal compound also cannot always be precisely defined. However, it should be noted that excessive amounts of the starting metal compound, for example +6 chromium, can lead to excessive amounts of +3 chromium when there is sufficient reducing agent present to reduce the excess +6 chromium, which can adversely affect the stability of the gels produced. As a general guide, the amount of the starting polyvalent metal compound used in preparing aqueous gels in accordance with the invention will be in the range of from about 0.025 to about 100, preferably from about 0.25 to about 50, weight percent of the amount of the cellulose ether used. Stated another way, the amount of the starting polyvalent metal compound used will usually be an amount sufficient to provide at least about $3 \times 10^{-6}$, preferably at least about $3 \times 10^{-5}$, gram atom of said metal capable of being reduced per gram of cellulose ether. Preferably, the amount of said metal capable of being reduced which is used will not exceed $4 \times 10^{-3}$, more preferably $2 \times 10^{-3}$, gram atom of said metal per gram of cellulose ether. However, in some situations it may be desirable to use amounts of the starting polyvalent metal compound which are outside the above ranges. Such use is within the scope of the invention. Those skilled in the art can determine the amount of starting polyvalent metal compound to be used by simple experiments carried out in the light of this disclosure.

Suitable water-soluble reducing agents which can be used in the practice of this invention include sulfur-containing compounds such as sodium sulfite, sodium hydrosulfite, sodium metabisulfite, potassium sulfite, sodium bisulfite, potassium metabisulfite, sodium sulfide, sodium thiosulfate, ferrous sulfate, thioacetamide, and others; and nonsulfur-containing compounds such as hydroquinone, ferrous chloride, p-hydrazinobenzoic acid, hydrazine phosphite, hydrazine dichloride, and others, as well as mixtures thereof.

The amount of reducing agent to be used in the practice of the invention will be a sensible amount, i.e., a small but finite amount which is more than incidental impurities and which is effective or sufficient to reduce at least a portion of the high valence metal in the starting polyvalent metal compound to a lower polyvalent valence state. Thus, the amount of reducing agent to be used depends, to some extent at least, upon the amount of the starting polyvalent metal compound which is used. In many instances, it will be preferred to use in excess of reducing agent to compensate for dissolved oxygen in the water, exposure to air during preparation of the gels, or any other possible contact with oxidizing substances such as might be encountered in said treating operations. As a general guide, the amount of reducing agent used will generally be within the range of from about 10 to about 200, preferably within the range of from about 75 to about 125, and more preferably about 95 to about 105 weight percent of the stoichiometric amount required to reduce the metal in the starting polyvalent metal compound to said lower polyvalent valence state, e.g., +6 Cr to +3 Cr. However, in some instances, it may be desirable to use amounts of reducing agent outside said ranges. The use of such amounts is within the scope of the invention. Those skilled in the art can determine the amount of reducing agent to be used by simple experiments carried out in the light of this disclosure.

Various methods can be used for preparing the aqueous medium employed in the practice of this invention. For example, either the reducible polyvalent metal compound or the reducing agent can be added separately to a solution of the cellulose ether in water or other aqueous medium, or the reducible polyvalent metal compound and the reducing agent can be added simultaneously to the solution or aqueous medium containing the cellulose ether. Generally speaking, where convenient, the preferred method is to first disperse the cellulose ether in the water or other aqueous medium. The reducing agent is then added to the dispersion of cellulose ether, with stirring. The metal compound is then added to the solution or aqueous medium containing the cellulose ether and the reducing agent, with stirring. Gelation starts as soon as reduction of some of the higher valence metal in the starting polyvalent metal compound to a lower valence state occurs. The newly formed lower valence metal ions, for example +3 chromium obtained from +6 chromium, effect rapid crosslinking of the cellulose ethers and gelation of the solution or aqueous medium containing same. It is essential to the practice of this invention that a lower valence metal ion, e.g. Cr +3, be newly formed in situ in the solution to be gelled, rather than be introduced to the solution in compound form at a reduced valence state, such as the addition of compounds, e.g. $CrCl_3$, $Cr(NO_3)_3$, and the like containing Cr at a +3 valence state. THe importance of the formation of the nascent state reduced metal ion in situ is related to the finding that gels formed with cellulose ethers, wherein the metal ion is added to the ether solution in a reduced valence form, unstable and undergo syneresis or precipitation. Accordingly, crosslinking methods heretofore employed by the art for the introduction of metals in a reduced valence form, such as the introduction of Cr +3 ions in a $CrCl_3$ compound form to an aqueous medium for the purpose of crosslinking water-dispersible polymers such as polyacrylamide and polysaccharides, are not suited to practice of this invention.

It is within the scope of this invention to prepare a dry mixture of the cellulose ether, the reducible polyvalent metal compound and the reducing agent, in proper proportions, and then add this dry mixture to the proper amount of water in order to form an aqueous gel suited to the practice of this invention.

The soil-treating aqueous solutions of the present invention can be applied to surfaces at a rate of about 0.5 to about 5, more generally about 1 to about 3, gallons per square yard. The application rate will depend, of course, upon the concentration of the active ingredients in the treating liquid and upon the nature of the surface. The soil-treating liquids can be applied in more than one application, with any amount of waiting time between applications.

The soil-treating liquid need not be applied as a single liquid. For example, the application can comprise contacting the soil consecutively with the same or different solutions. Thus, the soil can first be contacted with a solution of the gel-forming polymer in admixture with the polyvalent metal salt. This can be followed by contact with another solution containing the reducing agent. Similarly, a first solution can comprise the gel-forming polymer and the reducing agent while the second solution contains the polyvalent metal salt. The order of addition of such multiple contacts can also be varied. In some embodiments, such as in the treatment of leaking underground conduits, there can be some advantage, in some instances, in applying components of the soil-treating system in separate and consecutive solutions wherein the polyvalent metal salt and the reducing agent are in different solutions. Ordinarily, for most situations, it is preferred to apply the soil-treating liquid as a freshly prepared single solution.

An advantage of this invention is that ordinary ambient temperatures and other conditions can be used in practically all instances in preparing the aqueous gels of the invention or aqueous media containing same. In some instances, however, a small amount of heat may be desirable to aid in the formation of the gel, e.g., heating of the aqueous medium to a temperature of about 40° to about 130°F.

If desired, finely divided filler materials such as silica flour, diatomaceous earth, ground nut shells, natural sands, clay or clay-like materials such as Illite clay and kaolin, and finely divided plastic particles such as Microethene, etc., can also be incorporated in the aqueous gels used in the practice of this invention in order to increase the firmness of the gel.

When such filler agents are used, the amounts of such finely divided solids will generally be in the range of from 0.05 to 2, preferably in the range of about 0.1 to about 1.5, more preferably from in the range of about 0.3 to about 1, pounds per gallon of gel. It is usually convenient to base said amounts on the volume of water used in preparing the gel.

The aqueous gels having finely divided solids incorporated therein can be prepared in any suitable manner. For example, the finely divided solids can be dispersed into the polymer solution prior to the addition of the reducing agent and the reducible polyvalent metal. Alternatively, the finely divided solid material can be added as the last component to the aqueous gel composition.

Depending upon the identity of the finely divided solid material, the particle sizes can vary from about 0.015 to 420 microns. Diatomaceous earth is a presently preferred finely divided material. Any technical grade of diatomaceous earth can be used; however, the "Celite" brand of diatomaceous earth is presently preferred with the "Filter-Cel" grade of "Celite" being presently most preferred.

Aqueous gels in accordance with this invention can be prepared having a wide range of viscosities or firmness ranging from low viscosity or highly mobile gels having a relatively low viscosity up to firm or rigid gels which are nonmobile. The choice of gel viscosity or concentration will depend upon the use to be made of the gel. The actual viscosity and/or gel strength of the gel will depend upon the type and concentration of the cellulose ether, the type and amount of the starting polyvalent metal compound used, and the type and amount of reducing agent used.

The following examples will serve further to illustrate the practice of this invention:

EXAMPLE I

A 4,000 ppm CMC-9 solution containing 12,000 ppm of sand was prepared. Sodium dichromate dehydrate in the amount of 1,500 ppm and 1,500 ppm of sodium hydrosulfite were added to the solution. After 105 days, no separation of sand from the gel occurred and no syneresis, bleeding of water or water separation from the gel, occurred.

EXAMPLE II

A 3,000 ppm CMC-9 aqueous solution in fresh water was prepared. 500 ppm of sodium dichromate dihydrate and 500 ppm of sodium hydrosulfite were added to the solution. The resulting solution was mixed with 56,000 ppm of Illite type clay. After 350 days, no settling of the clay occurred or syneresis of water from the gel occurred.

EXAMPLE III

A 3-in. O.D. × 12-in. high cylinder having a ¼-in. thich wall was packed with 20–40 mesh Ottawa sand having a permeability of about 8,000 to 10,000 md. The sand pack was saturated with water and flow tested through a ⅛-in. I.D. tube connected to a hexagonal nut containing six ⅛-in. outlet holes. Fresh water was passed through the sand pack tube and outlets under a constant four-foot head of water at the rate of 100 cc in a 2.9-minute period. The sand pack was subsequently treated with 20 cc of a water solution prepared from 5,000 ppm of CMC-9, 1,500 ppm of sodium dichromate dihydrate, and 1,500 ppm of sodium hydrosulfite based on the total weight of the solution. The sand pack was allowed to stand overnight. The following day no fresh water passed through the six ⅛-in. outlet holes under a constant 4-foot head of water.

EXAMPLE IV

A box 12-in. square, 4-in. deep, having walls ¼-in. thick, containing a ½-in. O.D. rigid plastic tube, having eight holes 0.020-in. in diameter drilled at four different locations along the periphery of the tube, suspended horizontally about 6 inches from the bottom of the box, was filled with Mill Creek sand to within 2 inches of the top of the box. An ungelled polymer solution, prepared from 5,000 ppm of CMC-9 in solution in water containing 1,200 ppm sodium dichromate dihydrate, 1,000 ppm of sodium bisulfite, dyed with 10 parts per 100 ml of green food coloring, was injected into the plastic tube under sufficient pressure to force the solution into the holes in the tubing and into the pack. Thereafter the plastic tube was flushed with a clear CMC-9 aqueous solution prepared from an identical CMC-9 product in an identical concentration, i.e., 5,000 ppm based on the weight of total solution. The clear CMC-9 solution, however, did not contain any sodium dichromate dihydrate or sodium bisulfite. Twenty-four hours after flushing the plastic tube with the clear CMC-9 solution, fresh water containing a red dye, under constant pressure based on a 24-inch head of water through a ½-inch I.D. tube, was introduced to the plastic tube to determine whether or not the gelled polymer had diffused and consolidated the sand surrounding the eight holes in the plastic tube in a manner adequate to prevent the diffusion or escape of water from the plastic tube into the sand. Visual observation indicated that sand pack areas adjacent to the holes in the plastic tube were sufficiently consolidated by the gelled polymer to prevent escape of water from the tube into the sand pack area adjacent to the holes in the tube.

EXAMPLE V

A rectangular box, having sides 14 inches and 6 inches in width and 12 inches in height, having walls ¼-inch thick, containing a ½-inch I.D. polymethacrylate tube having twelve holes 0.035-inch in diameter suspended horizontally about 6 inches from the bottom of the box, was filled with sand screened to exclude any sand particles smaller than 20 mesh. The sand contained within the box was saturated with water. Under a constant pressure, based on a 4-foot water head in a ½-inch I.D. tube, water passed into the sand surrounding the 0.035-inch holes at a flow rate of 40 ml per minute. Subsequently a fresh water solution prepared from 5,000 ppm of Dow Pusher 700, a polyacrylamide having about 20 percent of the carboxyamide groups hydrolyzed to carboxylate groups and characterized by a viscosity of about 19 centipoises for a 0.5 percent by weight solution thereof in water at a temperature of 25°C, was treated with sufficient chromic chloride to provide 200 parts of $Cr^{+3}$ by weight per million parts by weight of polymer solution. 100 Ml of the chromic chloride-treated polyacrylamide solution was injected through the tube into the sand pack. Thereafter, the tube was flushed free of polymer with fresh water. Sixteen hours later, the flow rate of the sand pack under a constant pressure head of 4 feet of water was 8.5 ml per minute. This example illustrates that the employment of prior art methods for the control of the flow of aqueous fluids, comparable to those described in U.S. Pat. No. 3,687,200, is not as effective as the methods of this invention. This is further illustrated by a comparison of the flow rate data obtained in this example with the flow rate data obtained by the process of this invention in Example VI.

EXAMPLE VI

A test apparatus identical to that employed in Example IV was packed with water-saturated sand. The fresh water flow rate of the water-saturated sand at a constant pressure, based on a four-foot head of water, was 52 ml per minute. Subsequently, 100 ml of an ungelled polymer aqueous solution prepared from 5,000 ppm of CMC-9, 1,250 ppm of sodium dichromate dihydrate, and 1,000 ppm of sodium bisulfite was injected into the plastic tube and sand pack. Thereafter, the tube was flushed free of polymer with fresh water. Sixteen hours later, the flow rate of sand pack was zero ml per minute under a constant pressure head of 4 feet of water.

EXAMPLE VII

In this example, the invention was further demonstrated as an effective method of sealing the soil around a leaking commercial 4-inch I.D. ceramic sewer tile. A livestock water tank was modified so that a length of ceramic sewer tile ran through the length of the tank. A ¼-inch hole was drilled through one section of the tile to provide a point leak and a ¼-inch square slot was cut in the polyvinyl chloride joint liner seal to provide a seam leak. The tank was filled with river sand to a height of 14 inches of which 5 inches was above the tile. Elbows on the ends of the pipe permitted addition of the test solutions into the pipe to a height 2 inches above sand level. The degree of seal obtained with the sealants was determined by the leak rate as measured before and after each test at a constant waterhead.

Two solutions were prepared. The first contained 0.5 weight percent of the sodium salt form of carboxymethyl cellulose (CMC-9H). Just prior to use, a second solution was prepared by mixing sodium dichromate dihydrate and sodium bisulfite in a portion of the first solution at concentrations of 0.1 weight percent and 0.08 weight percent, respectively. The freshly prepared second solution was charged into the sewer tile to a level at the top of the elbows. A 2-foot water head was then applied to force the solution through the leaks. The waterhead was shortly after reduced to 8 inches and after one-half hour the liquid in the pipe was displaced by adding solution No. 1 until the drainage was clear. The system was allowed to stand for 16 hours with the tile full of solution No. 1. The tile was then drained and flushed with water. The leak rate was then determined. Before sealing, the leak rate was 1,100 cc/min and after sealing the leak rate was 33 cc/min. This represented a 97 percent effective seal. There was a ½-inch layer of gelled polymer on the bottom of the tile and the rest of the tile had a ¼-inch coating of polymer.

EXAMPLE VIII

Example VII was essentially repeated except that the sealing was carried out under more severe conditions in which the sand bed and pipeline were under a water pressure. This was done by filling the tank with water to a height of 3 inches above the top of the sand. Using a solution reservoir with a two-foot waterhead, 10 inches above the top of the sand, solution No. 2 was charged into the pipeline. After about 5 minutes, the waterhead was reduced to 8 inches and maintained for one-half hour. This solution was then displaced with solution No. 1 which was left in the tile for 16 hours. The tile was then drained, flushed with water, and the leak rate was then determined. Before sealing the leak rate was 900 cc/min and after sealing the leak rate was 30 ml/min. This represented a 97 percent effective seal. The bottom of the tile had a one-inch layer of gelled polymer and the rest of the tile had a one-quarter inch plus coating of polymer.

The foregoing examples illustrate that the process of this invention consolidates and agglomerates unconsolidated soil and that treatment of unconsolidated soil in accordance with the process of this invention improves the ability of unconsolidated soil to withstand penetration by water.

That which is claimed is:

1. A method for the agglomeration and stabilization of unconsolidated soil on the surface of the earth exposed to the atmosphere which comprises the steps of contact said unconsolidated soil, in the presence of sufficient water to form an aqueous gel, with (a) a water-thickening amount of a water-soluble cellulose ether, (b) an amounnt of a water-soluble compound of a reducible polyvalent metal wherein the amount of said polyvalent metal present is sufficient to gel said ether and said water when the valence of at least a portion of the polyvalent metal is reduced to a lower valence state, and (c) an amount of a water-soluble reducing agent wherein the amount of said reducing agent present is sufficient to reduce at least a portion of the polyvalent metal to a lower valence state, thereby converting the thus-contacted unconsolidated soil into a consolidated soil.

2. A method in accordance with claim 1 wherein the amount of the water-soluble polyvalent metal compound is an amount sufficient to supply at least $3 \times 10^{-6}$ gram atom of polyvalent metal capable of being reduced to a lower valence state per gram of said water-soluble cellulose ether.

3. A method in accordance with claim 1 wherein the aqueous gel comprises an aqueous media to which there has been added:
   at least about 50 ppm by weight of a water-soluble cellulose ether based on the weight of the aqueous media;
   from about 0.025 to about 100 weight percent of reducible polyvalent metal compound based on the weight of said cellulose ether; and
   from about 10 to about 200 percent of the stoichiometric amount of the reducing agent required to reduce the polyvalent metal to a lower valence state.

4. A method in accordance with claim 1 wherein said cellulose ether is a carboxymethyl cellulose ether.

5. A method according to claim 3 wherein:
   the cellulose ether is sodium carboxymethyl cellulose;
   the reducible polyvalent metal compound is sodium dichromate; and
   the reducing agent is sodium hydrosulfite.

6. A method in accordance with claim 1 wherein the amount of said water-soluble cellulose ether, the amount of said water-soluble compound, and the amount of said water-soluble reducing agent are sufficient for the resulting gel to seal the thus consolidated soil to form a fluid barrier to prevent the passage of water therethrough.

7. A method of sealing a leak in a conduit which is relatively shallowly deployed in a generally horizontal position in a porous medium by establishing a fluid barrier in the portion of said porous medium surrounding said conduit in the immediate vicinity of said leak, which comprises the step of introducing through said leak in said conduit into the pores of said portion of said porous medium an aqueous solution of (a) a water-thickening amount of a water-soluble cellulose ether, (b) an amount of a water-soluble compound of a reducible polyvalent metal wherein the amount of said polyvalent metal present is sufficient to gel said ether and said water when the valence of at least a portion of the polyvalent metal is reduced to a lower valence state and (c) an amount of a water-soluble reducing agent wherein the amount of said reducing agent present is sufficient to reduce at least a portion of the polyvalent metal to a lower valence state, thereby converting the thus contacted portion of said porous medium into a fluid barrier.

8. A method in accordance with claim 7 wherein said solution comprises an aqueous media to which there has been added:
   at least about 50 ppm by weight of a water-soluble cellulose ether based on the weight of the aqueous media;
   from about 0.025 to about 100 weight percent of reducible polyvalent metal compound based on the weight of said cellulose ether; and from about 10 to about 200 percent of the stoichiometric amount of the reducing agent required to reduce the polyvalent metal to a lower valence state.

9. A method in accordance with claim 8 wherein the polyvalent metal compound is selected from the group consisting of ammonium chromate, ammonium dichromate, the alkali metal chromates and dichromates, chromium trioxide, and mixtures thereof, and wherein the reducing agent is selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, ferrous chloride, p-hydrazinobenzoic acid, hydrazine phosphite, hydrazine dihydrochloride, and mixtures thereof.

10. A method in accordance with claim 1 wherein the polyvalent metal compound selected from the group consisting of ammonium chromate, ammonium dichromate, the alkali metal chromates and dichromates, chromium trioxide, and mixtures thereof, and wherein the reducing agent is selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, ferrous chloride, p-hydrazinobenzoic acid, hydrazine phosphite, hydrazine dihydrochloride, and mixtures thereof.

* * * * *